(12) United States Patent
Schulte, Jr. et al.

(10) Patent No.: US 9,590,760 B2
(45) Date of Patent: Mar. 7, 2017

(54) ANALOG RF MEMORY SYSTEM

(71) Applicant: Raytheon Company, Waltham, MA (US)

(72) Inventors: Walter B. Schulte, Jr., Huntington Beach, CA (US); John P. Gianvittorio, Venice, CA (US); Harry B. Marr, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 62 days.

(21) Appl. No.: 14/294,783

(22) Filed: Jun. 3, 2014

(65) Prior Publication Data

US 2015/0349914 A1 Dec. 3, 2015

(51) Int. Cl.
| | |
|---|---|
| H04K 3/00 | (2006.01) |
| H04L 7/00 | (2006.01) |
| H04L 27/34 | (2006.01) |
| H04L 27/26 | (2006.01) |
| G01S 7/38 | (2006.01) |

(52) U.S. Cl.
CPC .................. *H04K 3/42* (2013.01); *G01S 7/38* (2013.01); *H04L 7/0025* (2013.01); *H04L 27/2627* (2013.01); *H04L 27/34* (2013.01)

(58) Field of Classification Search
None
See application file for complete search history.

(56) References Cited

U.S. PATENT DOCUMENTS

| | | |
|---|---|---|
| 2,989,744 A | 6/1961 | Pettit |
| 3,170,158 A | 2/1965 | Rotman |
| 3,720,952 A | 3/1973 | Lawsine |
| 4,328,496 A | 5/1982 | White |
| 4,613,863 A | 9/1986 | Mitchell |

(Continued)

FOREIGN PATENT DOCUMENTS

| | | |
|---|---|---|
| CA | 1229926 A1 | 12/1987 |
| CN | 101241535 A | 8/2008 |

(Continued)

OTHER PUBLICATIONS

International Search Report and Written Opinion; International Application No. PCT/US2015/033207; International Filing Date: May 29, 2015; Date of Mailing: Sep. 17, 2015; 11 pages.

(Continued)

*Primary Examiner* — Mohammed Rachedine
(74) *Attorney, Agent, or Firm* — Cantor Colburn LLP

(57) ABSTRACT

An electronic analog memory system includes at least one analog programmable delay module configured to receive an input radio frequency pulse. The analog programmable delay module generates a time delayed output signal in response to applying at least one time delay to the input radio frequency pulse. A switching module is configured to selectively deliver the time delayed output signal to an output of the electronic analog memory system. The electronic analog memory system further includes an activity detector module configured to determine the amplitude of the input radio frequency pulse. The activity detector module also controls the switching module to deliver the time delayed output signal to the output in response to the at least one amplitude exceeding an amplitude threshold.

18 Claims, 4 Drawing Sheets

(56) References Cited

U.S. PATENT DOCUMENTS

| | | | |
|---|---|---|---|
| 5,032,839 | A | 7/1991 | Even-Or |
| 5,717,620 | A | 2/1998 | Williams |
| 6,091,704 | A | 7/2000 | Butash |
| 6,285,197 | B2* | 9/2001 | Walker ............... 324/603 |
| 6,898,235 | B1 | 5/2005 | Carlin et al. |
| 7,801,228 | B2 | 9/2010 | Lehne et al. |
| 8,578,256 | B2 | 11/2013 | Graef |
| 2001/0011893 | A1* | 8/2001 | Walker ............. H04L 1/205 324/603 |
| 2001/0022811 | A1 | 9/2001 | Lillington |
| 2003/0112904 | A1 | 6/2003 | Fuller et al. |
| 2003/0133524 | A1 | 7/2003 | Miller et al. |
| 2004/0189384 | A1* | 9/2004 | Kemna ............. H03F 1/3223 330/151 |
| 2007/0223607 | A1 | 9/2007 | Lehne et al. |
| 2009/0163161 | A1 | 6/2009 | Robinson et al. |
| 2010/0315292 | A1 | 12/2010 | Ciu et al. |
| 2011/0274222 | A1 | 11/2011 | Hinson |
| 2014/0105416 | A1 | 4/2014 | Huttunen et al. |
| 2014/0210666 | A1 | 7/2014 | Maltsev et al. |
| 2014/0241463 | A1* | 8/2014 | Leenaerts ......... H04B 7/0617 375/299 |

FOREIGN PATENT DOCUMENTS

| | | | |
|---|---|---|---|
| EP | 0344794 | A2 | 12/1989 |
| EP | 1596220 | B1 | 11/2005 |
| EP | 2425635 | A1 | 8/2013 |
| EP | 2728770 | A2 | 5/2014 |
| EP | 2779473 | A2 | 9/2014 |
| FR | 2689249 | A1 | 10/1993 |
| GB | 2308034 | A | 6/1997 |
| KR | 20080020078 | A | 3/2008 |
| WO | 9306502 | A1 | 4/1993 |
| WO | 9939517 | A3 | 10/1999 |
| WO | 0011823 | A1 | 3/2000 |
| WO | 0041340 | A1 | 7/2000 |
| WO | 2005050241 | A3 | 6/2005 |
| WO | 2012024507 | A2 | 2/2012 |

OTHER PUBLICATIONS

Balakrishnan et al., "Implementation of radix-2 and split-radix fast fourier transform algorithm using current mirrors", 2013 International Conference on Circuits, Power and Computing Technologies (ICCPCT), IEEE, Mar. 20, 2013, pp. 730-735.

International Search Report and Written Opinion; International Application No. PCT/US2015/016298; International Filing Date: Feb. 18, 2015; Date of Mailing: May 11, 2015; 14 pages.

Suh et al., "Low-Power Discrete Fourier Transform for OFDM: A Programmable Analog Approach", IEEE Transactions on Circuits and Systems I: Regular Papers, IEEE, vol. 58, No. 2, Feb. 1, 2011, pp. 290-298.

Akpa et al., "N-parallel filter bank equivalent to tree structure", Electrical and Computer Engineering Conference Proceedings, 1994, pp. 494-496.

International Search Report and Written Opinion; PCT Application No. PCT/US2015/025537; International Filing Date: Apr. 13, 2015; Mailing Date: Jul. 28, 2015; 12 pages.

Lillington, "Flexible channelisation architectures for Software Defined Radio front ends using a Tuneable Pipelined Frequency Transform", IET Seminar Digest, vol. 2003, No. 1, 2003, pp. 1-13.

PCT International Search Report and Written Opinion; International Application No. PCT/US2015/039877; International Filing Date: Jul. 10, 2015; Date of Mailing: Oct. 6, 2015; 12 pages.

Ahnstrom et al., "Detection and direction-finding of spread spectrum signals using correlation and narrowband interference rejection", Proc. Nordic Matlab Conference, Copenhagen, Denmark, 2003, 5 pages.

Chang et al., "Reconfigurable Architectures for Low Complexity Software Radio Channelizers using Hybrid Filter Banks," 10th IEEE Singapore International Conference on Communication systems, Oct. 2006, pp. 1-5.

Darak et al., "A reconfigurable filter bank for uniform and non-uniform channelization in multi-standard wireless communication receivers," IEEE 17th International Conference on Telecommunications (ICT), Apr. 4-7, 2010, pp. 951-956.

Holler et al. "A 2-20-GHz Analog Lag Correlator for Radio Interferometry", IEEE Transactions on Instrumentation and Measurement, vol. 61, No. 8, Aug. 2012, pp. 2253-2261.

Houghton et al., "Direction finding on spread-spectrum signals using the time-domain filtered cross spectral density", IEEE Proceedings of Radar, Sonar and Navigation, vol. 144, No. 6, Dec. 1997, pp. 315-320.

Lambrecht et al., "True-Time-Delay Beamforming With a Rotman-Lens for Ultrawideband Antenna Systems", IEEE Transactions on Antennas and Propagation, vol. 58, No. 10, Oct. 2010, pp. 3189-3195.

Lehne et al., "A 0.13-um 1-GS/s CMOS Discrete-Time FFT Processor for Ultra-Wideband OFDM Wireless Receivers", IEEE Transactions on Microwave Theory and Techniques, vol. 59, No. 6, Jun. 2011, pp. 1639-1650.

Lillington, "The pipelined frequency transform (PFT)", RF Engines, Electronic Engineering, Jun. 17, 2002, pp. 1-5.

Mahesh et al., "Coefficient decimation approach for realizing reconfigurable finite impulse response filters," IEEE International Symposium on Circuits and Systems, ISCAS, May 18-21, 2008, pp. 81-84.

Mahesh et al., "Reconfigurable low area complexity filter bank architecture based on frequency response masking for nonuniform channelization in software radio receivers", IEEE Transactions on Aerospace and Electronic Systems, vol. 47, No. 2, Apr. 2011.

Navarro et al. "Non-uniform channelization methods for next generation SDR PMR base stations", 2011 IEEE Symposium on Computers and Communications, Jul. 2011, pp. 620-625.

Sju, "Pipelined Frequency Transform PFT", RF Engines Limited Data Sheet, Apr. 29, 2002, pp. 1-25.

Smitha et al., "A new low power reconfigurable decimation interpolation and masking based filter architecture for channel adaptation in cognitive radio handsets," Physical Communication, 2, Jan. 2009, pp. 47-57.

Zhang et al., "Reconfigurable beam forming using phase-aligned Rotman lens", www.ietdl.org, The Institute of Engineering and Technology, 2012, pp. 326-330.

\* cited by examiner

US 9,590,760 B2

ANALOG RF MEMORY SYSTEM

BACKGROUND

Radar defense systems include radar jamming units that utilize digital radio frequency (RF) memory (DRFM) units configured to generate counter radar signals. A typical DRFM unit utilizes an analog-to-digital (A/D) converter to convert one or more received analog radar pulses into an equivalent digital signal. Conventional jamming units also include a digital time delay unit that digitally programs one or more time delays into the replicated digital signal before converting the replicated digital signal back into an analog signal. The replicated counter radar signal having the time delay is then returned to the source of the radar pulse. However, conventional A/D converters having an acceptable dynamic range are typically limited to processing signals of no greater than approximately 1 gigahertz (GHz) wide. Furthermore, the signal processing operations performed by the A/D converter inherently results in an additional time delay before the replicated signal is ultimately returned to the source of the radar pulse. For example, a DRFM unit requires an additional pulse repetition interval between the time at which a first radar pulse is received and the time at which the counter radar signal is output.

SUMMARY

According to an embodiment, an electronic analog memory system includes at least one analog programmable delay module configured to receive at least one input radio frequency pulse. The analog programmable delay module generates a time delayed output signal in response to applying at least one time delay to the at least one input radio frequency pulse. A switching module is configured to selectively deliver the time delayed output signal to an output of the electronic analog memory system. The electronic analog memory system further includes an activity detector module configured to determine the amplitude of the at least one input radio frequency pulse. The activity detector module also controls the switching module to deliver the time delayed output signal to the output in response to the at least one amplitude exceeding an amplitude threshold.

According to another embodiment, a method of replicating at least one input radio frequency signal having at least one time delay comprises receiving the at least one input radio frequency pulse and generating a time delayed output signal in response to applying at least one time delay to the at least one input radio frequency pulse. The method further comprises determining at least one amplitude of the at least one input radio frequency pulse. The method further comprises selectively transmitting the time delayed output signal to a source of the at least one input radio frequency pulse in response to the at least one amplitude exceeding an amplitude threshold.

Additional features are realized through the techniques of the present invention. Other embodiments of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
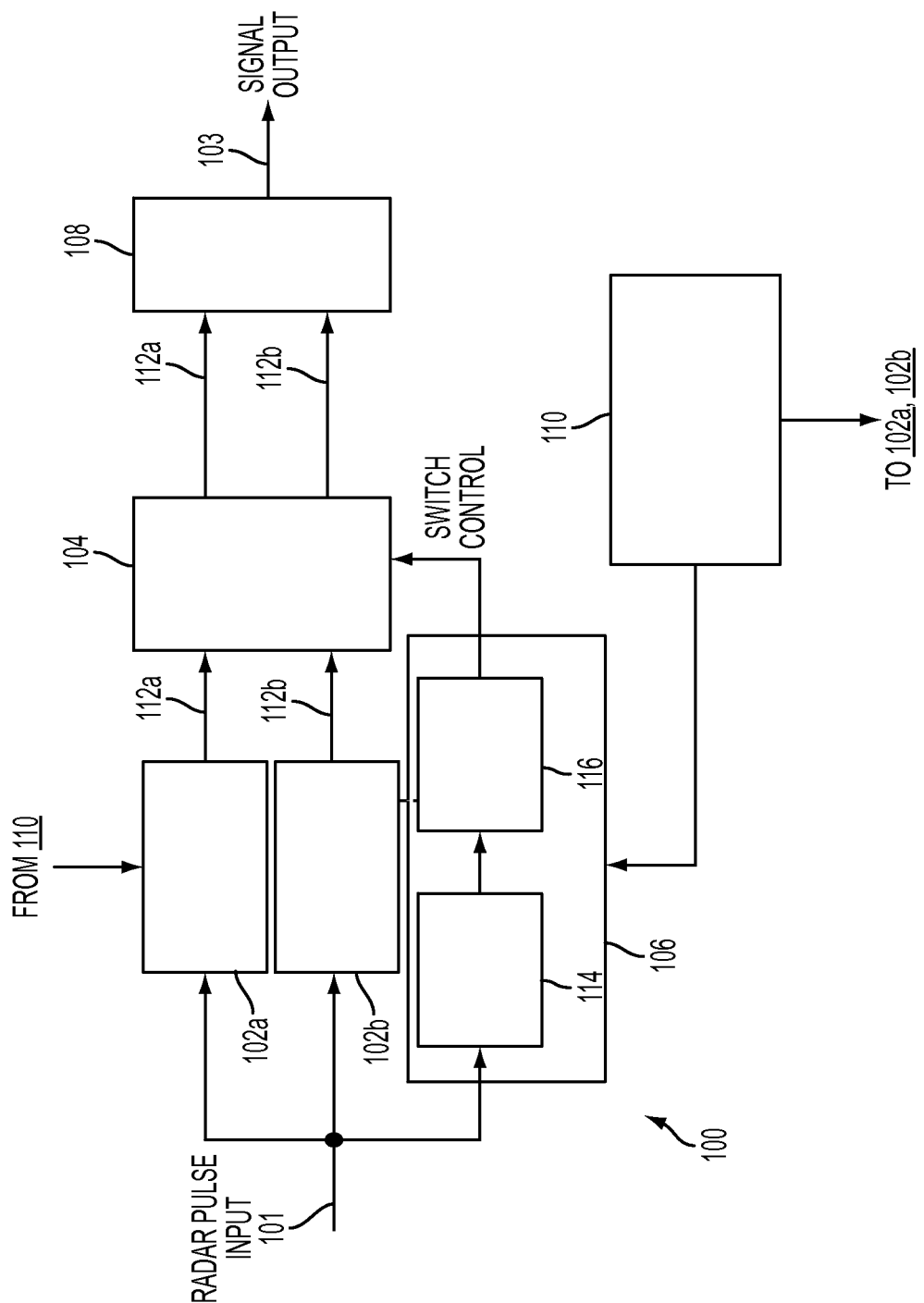
FIG. 1 is a block diagram of an analog RF memory system according to an exemplary embodiment.

Referring to FIG. 1, a block diagram of an analog RF memory system 100 is illustrated according to an exemplary embodiment. The analog RF memory system 100 includes a radar pulse input 101 that receives one or more intermediate frequency (IF) radar pulses, and a signal output 103 that outputs a replicated IF signal programmed with one or more time delays. According to an embodiment, the real component of a respective IF radar pulse is input to the analog RF memory system 100 as understood by one of ordinary skill in the art. The analog RF memory system 100 generates the replicated IF signal including one or more time delays without using an A/D converter. In this regard, additional pulse repetition intervals caused by time consuming signal processing operations are eliminated. Further, decreased dynamic ranges caused by an A/D converter can be avoided. The removal of the additional pulse repetition interval achieves unexpected results in that the IF output signal is generated more quickly than what is known in the conventional art. According to at least one embodiment, for example, the analog RF memory system eliminates the additional pulse repetition interval such that the replicated IF signal is generated and output in approximately 5 nanoseconds (ns).

The analog RF memory system 100 includes a plurality of programmable time delay (PTD) modules 102, a switching module 104, an activity detector module 106, a combiner module 108, and a control module 110. Although two PTD modules 102a, 102b are shown, it is appreciated that the number of PTD modules may vary. For example, the analog RF memory system 100 may include more than two PTD modules (i.e., n number of PDT modules), or only a single PTD module.

Each PTD module 102a, 102b includes an input that receives one or more IF radar pulses, and an output that delivers a time delayed output signal programmed with one or more time delays to a respective signal path 112a, 112b. Each PTD module 102a, 102b generates the time delayed output signal without the use of an A/D converter. In this regard, additional pulse repetition intervals caused by time consuming signal processing operations are eliminated. According to an embodiment, a first PTD module 102a generates a first time delayed output signal that is programmed with a first time delay, and a second PTD module 102b generates a second time delayed output signal that is programmed with a second time delay that is different than the first time delay. For example, the second time delay may be greater or less than the first time delay. The combiner 108 may combine the first and second time delays to generate a replicated IF signal that is programmed with a plurality of different time delays. In this regard, the output IF signal can be initially repeated according to the first time delay, and then subsequently repeated according to the second time delay. Although two delays are described above, it is appreciated that the IF output signal may be repeated according to various different time delays programmed therein.

Each PTD module 102a, 102b generates a fixed time delay signal based on a clock cycle that is selectively delivered to the input IF radar pulse as discussed in greater detail below. The multiple time delays (i.e., clock cycle delays) can be programmed into a respective time delayed output signal in response to delivering one or more of the fixed time delay signals to the input IF radar pulse.

The switching module 104 is interposed between each signal path 112a, 112b, and the combiner module 108. The switching module 104 is also in electrical communication with the activity detector module 106. The activity detector module 106 includes a Fourier transform unit 114 in electrical communication with an amplitude detector unit 116. The Fourier transform unit 114 divides an input IF radar pulse into a plurality of frequency band signals in response to executing a Fourier transform algorithm, and delivers each frequency band signal to a respective channel. The Fourier transform algorithm includes, but are not limited to, a fast Fourier transform (FFT) or a discrete Fourier transform. For example, a 10 GHz input IF radar pulse can be divided into ten 1 GHz signals that are delivered to a respective channel. The amplitude detector unit 116 compares the amplitude of a signal on a respective channel to an amplitude threshold. A single amplitude threshold can be assigned to all the channels or individual amplitude thresholds can be assigned to each respective channel. According to an embodiment, the amplitude detector unit 116 generates a switch control signal when the amplitude of the signal on a respective channel exceeds the amplitude threshold. One or more of the amplitude thresholds can be dynamically programmed based on a threshold control signal output from the control module 110.

The switching module 104 selects one or more signal paths 112a, 112b based on the switch control signal output by the activity detector module 106. According to an embodiment, the signal paths 112a, 112b can be dynamically enabled and disabled as the amplitude threshold changes. The combiner module 108 receives one or more time delayed output signals via a respective signal path 112a, 112b selected by the switching module 104. According to an embodiment, the combiner 108 combines each time delayed output signal to generate the replicated IF signal programmed with one or more time delays. The replicated IF signal is then delivered to the output 103 and returned to the source of the IF radar pulse as understood by one of ordinary skill in the art.

Figure 2:
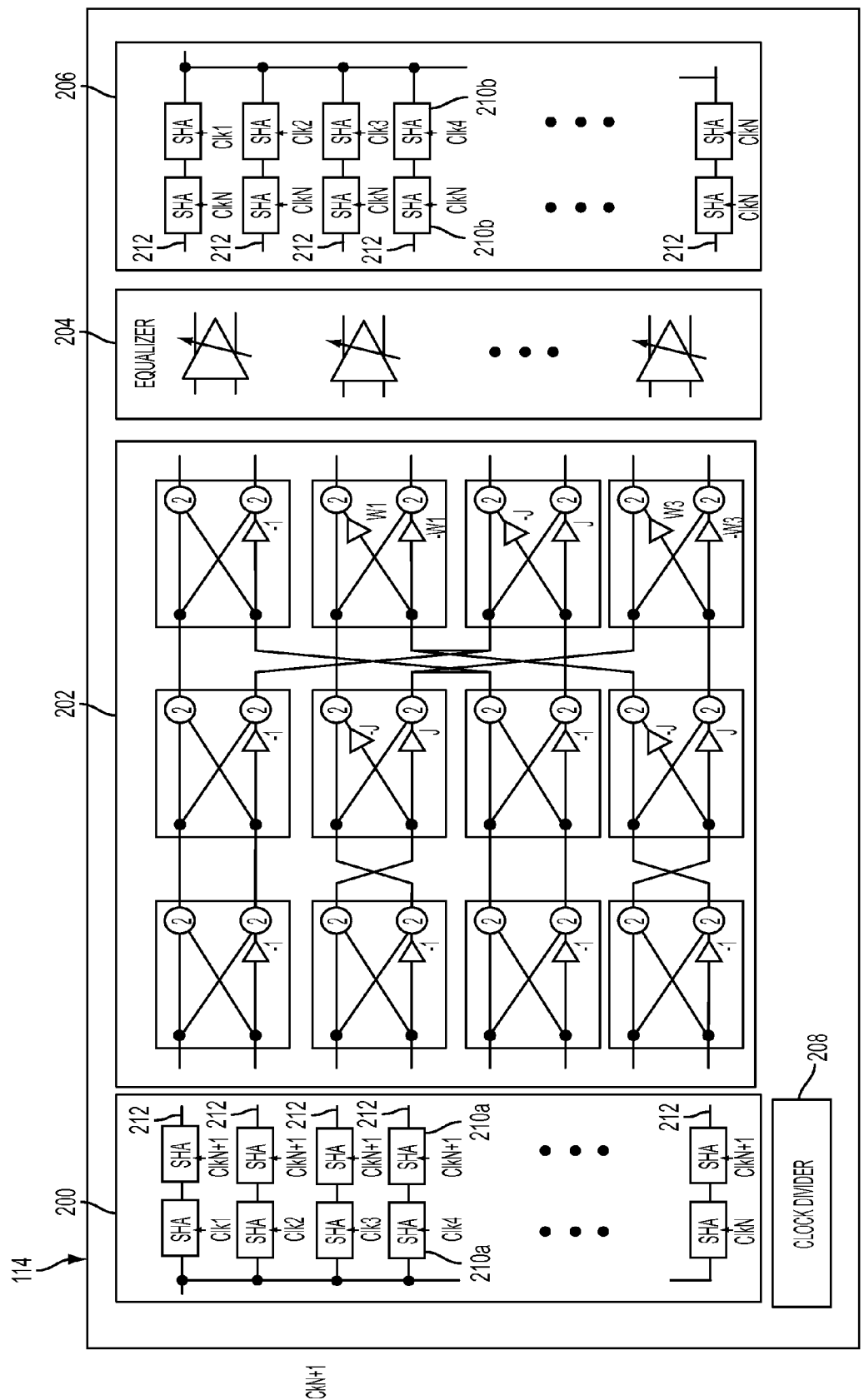
FIG. 2 illustrates a schematic of an electronic Fourier transform unit configured to execute a Fourier transform algorithm according to an exemplary embodiment.

Turning now to FIG. 2, an exemplary embodiment of electronic Fourier transform unit 114 configured to execute a FFT algorithm is illustrated. According to an embodiment, the Fourier transform unit 114 implements an 'n'-point FFT, where the value for 'n' is set by a frequency resolution as desired in a given application or environment. The Fourier transform unit 114 includes a serial-to-parallel converter module 200, a FFT signal flow module 202, an equalizer module 204, a parallel-to-serial converter module 206, and a clock divider 208.

The serial-to-parallel converter module 200 includes a plurality of sample-and-hold amplifiers (SHAs) 210a. The clock divider 208 generates one or more clock signals (Clk1, Clk2, Clk3, . . . ClkN) based on a division of an input master clock (ClkN+1). The SHAs 210a implement a serial-to-parallel conversion that divides the IF radar pulse into a plurality of individual signals corresponding to respective frequency resolution set by the FFT algorithm. The individual signals are then delivered to a respective channel 212 that is coupled to the FFT signal flow module 202.

The FFT signal flow module 202 outputs frequency samples corresponding to the individual signals generated by the serial-to-parallel converter module 200. The outputs of the FFT signal flow module 202 are delivered to the equalizer module 204. The equalizer module 204 is configured to strengthen (e.g., boost) and/or weaken (e.g., cut) the energy of specific frequencies or frequency bands. The output of the equalizer module 204 is delivered to the parallel-to-serial converter 206. The parallel-to-serial converter 206 includes a plurality of SHAs 210b. The SHAs 210b generate respective clock signals (Clk1, Clk2, Clk3, . . . ClkN) based on a division of an input master clock (ClkN) output by the clock divider 208. The clock signals drive the SHAs 210b in a similar manner as described above. In this regard, the parallel-to-serial converter 206 combines one or more of the signals output to the channels 212 to generate a constant stream output, which is delivered to the amplitude detector unit 116.

Figure 3:
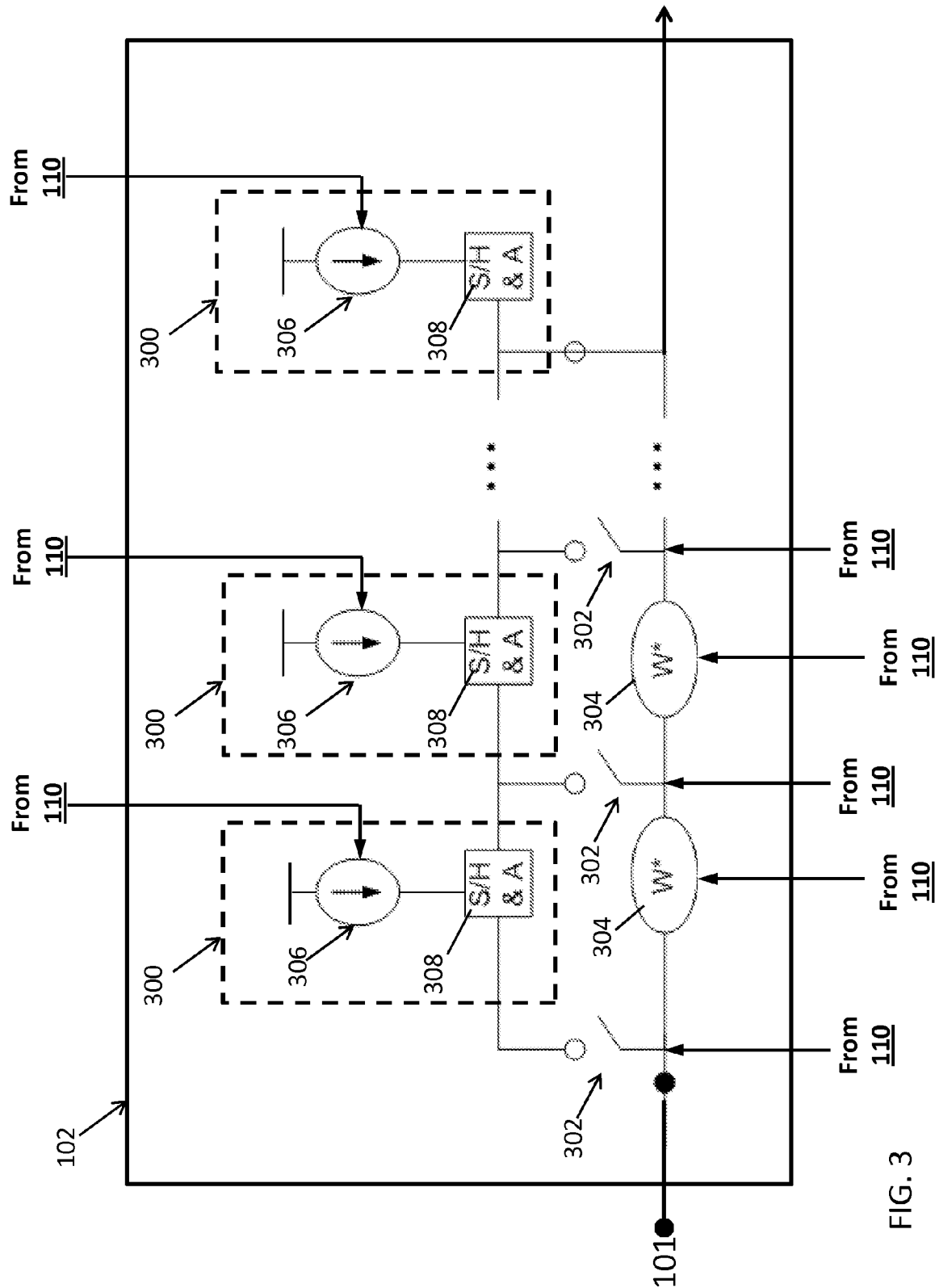
FIG. 3 illustrates a programmable time delay module configured to generate a time delay according to an exemplary embodiment.

Turning now to FIG. 3, a programmable time delay module 102 configured to program a time delay in an input IF radar pulse is illustrated according to an exemplary embodiment. The programmable time delay module 102 includes one or more timing circuits 300 selectively connected to the IF radar pulse input 101 via a respective switch 302. Each switch 302 is enabled and/or disabled in response to a timing switch control signal output from the control module 110. For example, the control module 110 may determine the time delay to be applied (i.e., programmed) into the input IF radar pulse received at the radar pulse input 101. The time delay can be programmed into the control module 110 by a user and/or can be automatically set by the control module 110 based on a detected external scenario. In response to determining the time delay, the control module 110 generates one or more timing switch control signals that enable and/or disable a respective switch 302. The combination of enabled and disabled switches 302 determines the overall time delay that is programmed in a time delayed output signal generated by a respective time delay module 102. If each timing circuit 300 generates a time delay of 90 ns, for example, the control module can enable a single switch 302 corresponding to a respective timing circuit 300 to program a 90 ns time delay into the input IF radar pulse. The control module 110, however, can enable two switches 302 to program a 180 ns time delay into the input IF radar pulse.

The programmable time delay module 102 also includes one or more signal effect units 304 that are controlled by the control module 110. Each signal effect unit 304 applies a weighted coefficient that affects one or more signal characteristics of the input IF radar pulse. The signal characteristics include, but are not limited to, an amplitude modulation, an interpolated time delay, and a phase shift. The interpolated time delay can act as a fine tune adjustment to the fixed time delays provided by the timing circuits 300. According to an embodiment, the weight (i.e., a numerical coefficient) can be programmed via the control module 110. The control module 110 then outputs a coefficient control signal to a respective signal effect unit 304, which applies (e.g., multiplies) the programmed coefficient to the input IF radar pulse such that the corresponding signal characteristic of the IF radar pulse is modified.

Each timing circuit 300 includes a programmable current source 306 having an output that is in electrical communication with a SHA 308. Each SHA 308 outputs a clock cycle delay signal that programs a fixed timed delay into the input IF radar pulse based on a clock signal. A separate clock unit may provide the clock signal to a respective SHA 308. The clock cycle delay signals may have a fixed time delay of, for example, a 1 ns clock cycle, or may have different fixed time delays with respect to one another. According to an embodiment, the SHA 308 is formed as a circuit including high-speed switching floating gates. The high-speed floating gates are configured to switch a signal having a frequency of, for example, at least 2.0 GHz. According to other embodiments, however, the high-speed floating gates can switch a signal having frequency being less than 2.0 GHz including, for example, 100 MHz.

The programmable current source 306 can also be controlled by the control module 110. For example, the control module 110 is configured to generate a current control signal to each programmable current source 306. The current control signal increases and/or decreases the level of current delivered to a respective SHA 308, which adjusts the signal-to-noise ratio (SNR) of the respective timing circuit 300. In this regard, the power consumption of a respective timing circuit 300 can be controlled and different bandwidths and/or dynamic ranges can be achieved.

Figure 4:
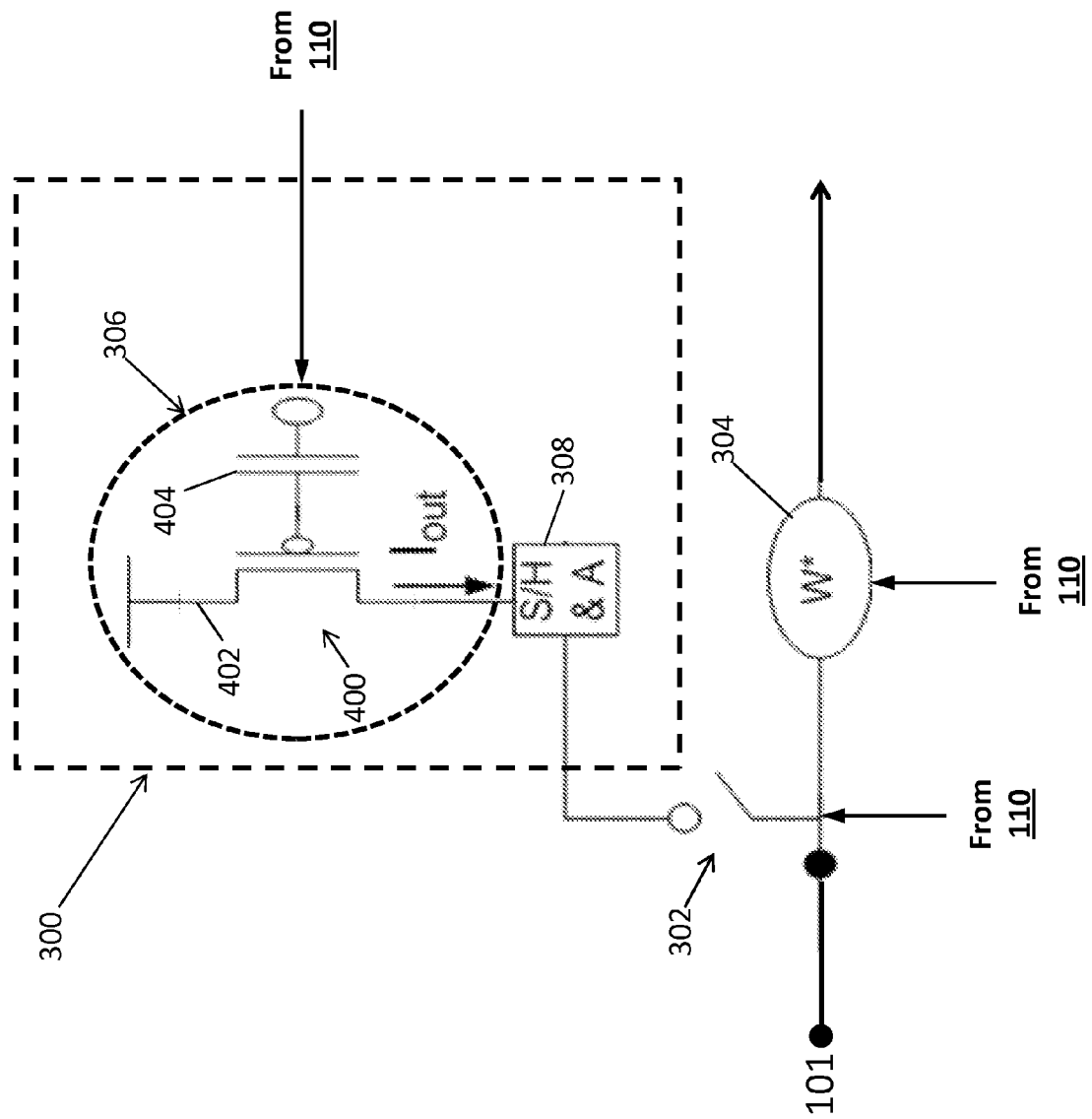
FIG. 4 illustrates a programmable current source included in a programmable time delay module according to an exemplary embodiment.

Referring now to FIG. 4, a programmable current source 306 included in a programmable time delay module 300 is illustrated according to an exemplary embodiment. The programmable current source 306 includes a high-speed switching floating gate circuit 400. The floating gate circuit 400 is formed as, for example, a high frequency transistor 402 having a gate connected to a capacitor 404. The floating gate circuit 400 is configured to switch high-frequency signals having a frequency of, for example, at least 2.0 GHz. According to other embodiments, however, the floating gate circuit 400 can switch a signal having frequency being less than 2.0 GHz including, for example, 100 MHz. Unlike conventional (DRFM) units that utilize a digital A/D converter incapable of switching high-frequency signals, the floating gate circuit 400 included in the time delay module 300 is configured to switch high-frequency IF radar pulses and radio frequency RF signals without incurring additional time delays caused by conventional DRFMs including an A/D converter.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An electronic analog memory system, comprising:
   at least one analog programmable delay module configured to receive at least one input radio frequency pulse and to generate a time delayed output signal in response to applying at least one time delay to the at least one input radio frequency pulse;
   a switching module configured to selectively deliver the time delayed output signal to an output of the electronic analog memory system; and
   an activity detector module configured to determine at least one amplitude of the at least one input radio frequency pulse and to control the switching module to deliver the time delayed output signal to the output in response to the at least one amplitude exceeding an amplitude threshold,
   wherein the activity detector module comprises:
      a Fourier Transform unit configured to divide the at least one input radio frequency pulse into a plurality of individual frequency band signals in response to executing a Fourier transform algorithm; and
      an amplitude detector unit that determines the amplitude of each frequency band signal and generates a switch control signal that controls the switching module to select at least one respective signal path in response to the amplitude of at least one frequency band signal exceeding a respective amplitude threshold.

2. The electronic analog memory system of claim 1, wherein the at least one analog programmable delay module includes a plurality of analog programmable delay modules, each analog programmable delay module generating a respective time delayed output signal that is delivered to a respective signal path.

3. The electronic analog memory system of claim 2, wherein a first time delayed output signal is programmed with a first time delay via a first analog programmable delay module and a second time delayed output signal is programmed with a second time delay via a second analog programmable delay module, the second time delay being different than the first time delay.

4. The electronic analog memory system of claim 3, further comprising a control module configured to generate a timing control signal that sets the first time delay and the second time delay, and a threshold control signal that sets at least one of the respective amplitude thresholds.

5. The electronic analog memory system of claim 4, wherein each analog programmable delay module comprises:
   at least one timing circuit configured to generate a respective clock cycle delay signal; and
   at least one switch configured to selectively apply the clock cycle delay signal to the at least one input radio frequency pulse.

6. The electronic analog memory system of claim 5, wherein the at least one timing circuit comprises:
   a programmable current source configured to output a current signal based on a current control signal generated by the control module; and
   a sample-and-hold amplifier in electrical communication with the programmable current source to store the current signal for a time period, to amplify the current signal to generate the clock cycle delay signal, and to apply the clock cycle delay signal to the at least one input radio frequency pulse after the time period expires such that the at least one input radio frequency pulse is programed with a respective time delay according to the clock cycle delay signal.

7. The electronic analog memory system of claim 6, wherein each analog programmable delay module comprises at least one signal effect unit configured to modify at least one signal characteristic of the at least one input radio frequency pulse.

8. The electronic analog memory system of claim 7, wherein the control module controls the at least one signal effect to modify at least one of to apply at least one of an amplitude modulation, an interpolated time delay, and a phase shift to the input radio frequency pulse.

9. The electronic analog memory system of claim 8, wherein the programmable current source includes a transistor having a gate connected to a capacitor, the transistor configured to switch a signal having a frequency of at least 2.0 GHz.

10. A method of replicating at least one input radio frequency signal having at least one time delay, the method comprising:
   receiving the at least one input radio frequency pulse and generating a time delayed output signal in response to applying at least one time delay to the at least one input radio frequency pulse;
   determining at least one amplitude of the at least one input radio frequency pulse;
   selectively transmitting the time delayed output signal to a source of the at least one input radio frequency pulse in response to the at least one amplitude exceeding an amplitude threshold;
   dividing the at least one input radio frequency pulse into a plurality of individual frequency band signals in response to executing a Fourier transform algorithm;
   determining the amplitude of each frequency band signal; and
   generating a switch control signal that controls the switching module to select at least one respective signal path in response to the amplitude of at least one frequency band signal exceeding a respective amplitude threshold.

11. The method of claim 10, further comprising generating a plurality of time delayed output signals to a respective signal path.

12. The method of claim 11, further comprising generating a first time delayed output signal that is programmed with a first time delay and a second time delayed output signal that is programmed with a second time delay, the second time delay being different than the first time delay.

13. The method of claim 12, further comprising generating via a control module a timing control signal that sets the first time delay and the second time delay, and generating a threshold control signal via the control module that sets at least one of the respective amplitude thresholds.

14. The method of claim 13, further comprising:
   generating a respective clock cycle delay signal; and
   selectively applying the clock cycle delay signal to the at least one input radio frequency pulse.

15. The method of claim 14, further comprising:
   generating a current signal that controls a dynamic range of the respective clock cycle delay signal;
   storing the current signal for a time period; and
   applying the clock cycle delay signal to the at least one input radio frequency pulse after the time period expires such that the at least one input radio frequency pulse is programed with a respective time delay according to the clock cycle delay signal.

16. The method of claim 15, further comprising modifying at least one signal characteristic of the at least one input radio frequency pulse.

17. The method of claim 16, wherein the at least one signal characteristic is an amplitude modulation, an interpolated time delay, and a phase shift of the input radio frequency pulse.

18. The method of claim 17, wherein the at least one input radio frequency signal has a frequency of at least 2.0 GHz.

* * * * *